(No Model.)

W. I. KNOX.
STALK CUTTER AND MOWER.

No. 409,979. Patented Aug. 27, 1889.

Witnesses  
Geo. G. Thorpe  
J. W. Garner

Inventor  
W. I. Knox.

By his Attorneys,

UNITED STATES PATENT OFFICE.

WASHINGTON IRVIN KNOX, OF TERRELL, TEXAS.

STALK-CUTTER AND MOWER.

SPECIFICATION forming part of Letters Patent No. 409,979, dated August 27, 1889.

Application filed October 13, 1888. Serial No. 288,019. (No model.)

*To all whom it may concern:*

Be it known that I, WASHINGTON IRVIN KNOX, a citizen of the United States, residing at Terrell, in the county of Kaufman and State of Texas, have invented a new and useful Improvement in Stalk-Cutters and Mowers, of which the following is a specification.

My invention relates to an improvement in stalk-cutters and mowers, designed especially for cutting corn-stubble and mowing weeds when preparing the ground for fall seeding; and it consists in the peculiar construction and combination of devices that will be more fully set forth hereinafter, and particularly pointed out in the claims.

Figure 1:
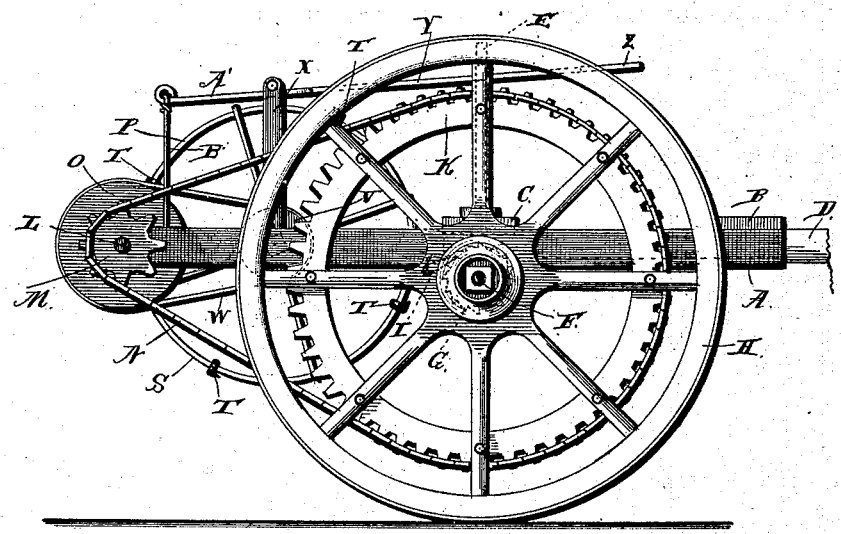
Figure 2:
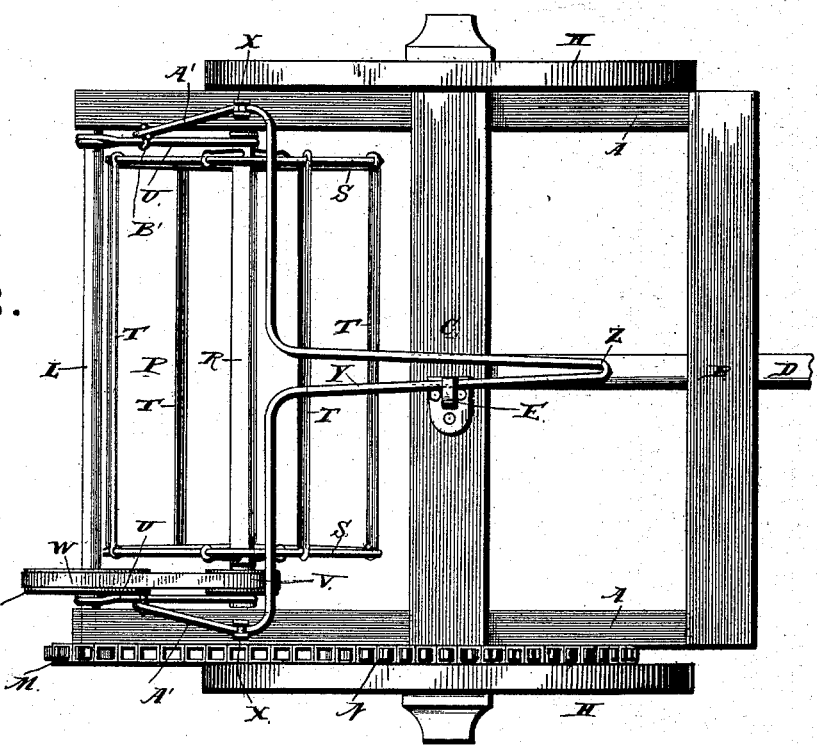

In the accompanying drawings, Figure 1 is a side elevation of a stalk-cutter and mower embodying my improvement. Fig. 2 is a top plan view of the same.

A represents a pair of side beams, which are connected at their front ends by a cross-bar B, and near their centers by a cross-bar C. The said beams constitute a rectangular frame.

D represents a tongue which has its heel secured under the centers of the beams B C, and from the upper side of the beam C, at the center thereof, projects a vertical rack-bar E.

F represents the driving and supporting shaft, which is journaled in bearings under the center of the frame. Rigidly secured to the said shaft, near the ends thereof, are ratchet-wheels G, and loosely mounted on the spindles at the ends of the shaft are driving and supporting wheels H. The same bear against the outer sides of the ratchet-wheels, and are provided with spring-actuated pawls I, that engage the ratchet-wheels and thereby lock the wheels H to the shaft G when the machine moves forward, to cause said wheels to rotate the shaft, and enabling one of the wheels to turn independently of the shaft when the machine is making an abrupt turn. Rigidly secured to the inner side of one of the wheels H is a sprocket-wheel K.

L represents a transverse shaft, which is journaled in bearings in the rear ends of the beams A. The said shaft has a small sprocket-wheel M at one end, which is connected to the wheel K by an endless sprocket-chain N, and on the said shaft L is also rigidly secured a sprocket wheel or pulley O.

P represents a reel, which comprises a central shaft R, a pair of wheels or disks S near the ends thereof, and a series of longitudinal cutters T, which connect the said wheels or disks at their peripheries and are arranged at regular distances apart. The said reel P has its bearings in a pair of links or arms U, which are hinged or pivoted on the shaft L and depend therefrom, whereby the reel is suspended from the said shaft. Near one end of the reel-shaft R is secured a small sprocket wheel or pulley V, which is connected to the sprocket wheel or pulley O by means of an endless chain or belt W.

X represents a pair of vertical standards, which rise from the beams A at a suitable distance from the rear ends thereof, and in the upper ends of said standards is pivoted a yoke or lever Y, that is provided with a forwardly-projecting arm Z, adapted to engage the notches or teeth of the rack E and secure the lever at any desired inclination. The rearwardly-extending arms A' of the lever are connected to the links U by rods B'.

From the foregoing description it will be understood that the reel may be raised or lowered and arranged at any desired height above the ground by adjusting the lever Y.

The operation of my invention is as follows: When the machine is in motion, rotary motion is transmitted from the wheel K to the shaft L by the endless chain N and sprocket-pinion M, and similar motion is transmitted from the shaft L to the reel by the pulleys O V and the endless belt connecting the same, the reel being thus caused to rotate at a considerable rate of speed. By lowering the reel to within a suitable distance of the ground the cutters thereof sever the stalks of corn-stubble and mow the weeds, thus effectually clearing the ground for fall seeding.

Having thus described my invention, I claim—

1. In a stalk-cutter and mower, the combination of the frame, the driving-wheel having sprocket K, the shaft L, having the sprocket-pinion and pulley O, the chain connecting the sprocket K with the sprocket-pinion, the links U, hinged to and depending from the shaft L, the reel journaled in said links and having the longitudinal cutters, said reel having the pulley V, the endless belt connecting pulleys O and V to rotate the reel, and the lever pivoted to the frame and connected to the reel to raise and lower the same, substantially as described.

2. In a stalk-cutter and mower, the combination, with the shaft L, having pulley O, and means, substantially as set forth, to rotate the same, of the pivoted links U, the reel having its shaft journaled in said links and provided with the longitudinal cutters and with the pulley V, the endless belt connecting the said pulleys O and V, and the lever connected to the reel to raise and lower the same, substantially as described.

In testimony that I claim the foregoing as my own I have hereto affixed my signature in presence of two witnesses.

WASHINGTON IRVIN KNOX.

Witnesses:
W. B. MARTIN,
J. H. BROWN.